(12) United States Patent
Barnes

(10) Patent No.: US 9,027,683 B2
(45) Date of Patent: May 12, 2015

(54) ELASTICALLY DEFORMABLE AIR INLETS AND VEHICLES INCORPORATING THE SAME

(71) Applicant: Toyota Motor Engineering & Manufacturing North America, Inc., Erlanger, KY (US)

(72) Inventor: Chad A. Barnes, Saline, MI (US)

( * ) Notice: Subject to any disclaimer, the term of this patent is extended or adjusted under 35 U.S.C. 154(b) by 71 days.

(21) Appl. No.: 14/039,327

(22) Filed: Sep. 27, 2013

(65) Prior Publication Data

US 2015/0090509 A1    Apr. 2, 2015

(51) Int. Cl.
*B60K 13/06* (2006.01)
*B60K 13/02* (2006.01)

(52) U.S. Cl.
CPC ...................................... *B60K 13/02* (2013.01)

(58) Field of Classification Search
CPC ........ B60K 11/00; B60K 11/06; B60K 11/08; B60K 13/00; B60K 13/02; B60K 13/06
USPC ................... 180/68.1, 68.2, 68.3; 123/184.21, 123/184.47, 184.51, 184.53, 184.56
See application file for complete search history.

(56) References Cited

U.S. PATENT DOCUMENTS

| | | | |
|---|---|---|---|
| 4,373,665 A * | 2/1983 | Dietzsch | 237/12.3 A |
| 6,123,616 A | 9/2000 | Otsuka | |
| 7,273,121 B2 | 9/2007 | Kino et al. | |
| 7,523,798 B2 | 4/2009 | Muramatsu et al. | |
| 8,157,040 B2 * | 4/2012 | Khouw et al. | 180/68.3 |
| 8,403,404 B2 | 3/2013 | Kihara et al. | |
| 2009/0255501 A1 | 10/2009 | Honzawa et al. | |
| 2012/0193156 A1 * | 8/2012 | Hirano | 180/68.1 |

FOREIGN PATENT DOCUMENTS

EP    1693239    8/2012
JP    2012066611    4/2012

* cited by examiner

*Primary Examiner* — John Walters
(74) *Attorney, Agent, or Firm* — Dinsmore & Shohl LLP

(57) ABSTRACT

Elastically deformable air inlets are disclosed. In one embodiment, an air inlet includes a first portion having an interior surface and an exterior surface, and a second portion having an interior surface and an exterior surface and including at least one deformation zone. The first portion and the second portion define a hollow space. The air inlet also includes at least one support member including a first end and a second end that extends from the interior surface of the first portion toward the interior surface of the second portion. The second end of the support member contacts the deformation zone, wherein when an external force is applied to the air inlet, the second end of the support member extends through the deformation zone.

20 Claims, 9 Drawing Sheets

ELASTICALLY DEFORMABLE AIR INLETS AND VEHICLES INCORPORATING THE SAME

TECHNICAL FIELD

The present specification generally relates to air inlets and, more particularly, to air inlets that elastically deform when subject to an external force.

BACKGROUND

Air inlets are utilized in automobiles and other motor vehicles to supply air to components located under the hood of the motor vehicle. For example, an air inlet may be disposed between the hood of the motor vehicle and the radiator support to supply air to the engine. When the hood of a motor vehicle is subject to an external force, such as an impact with another object, the hood deforms under the applied load. If an air inlet is placed directly beneath the hood, it will also be subject to that external force. However, air inlets have components that will break or fail when subject to an external force. Accordingly, the air inlet may hinder the hood's ability to properly deform and increase repair and replacement costs.

Accordingly, a need exists for alternative air inlet structures that can elastically deform when subject to an external force.

SUMMARY

In one embodiment, an air inlet includes a first portion having an interior surface and an exterior surface, and a second portion having an interior surface and an exterior surface and including at least one deformation zone. The first portion and the second portion define a hollow space. The air inlet also includes at least one support member including a first end and a second end that extends from the interior surface of the first portion toward the interior surface of the second portion. The second end of the support member contacts the deformation zone, wherein when an external force is applied to the air inlet, the second end of the support member extends through the deformation zone.

In another embodiment, an air inlet includes a first portion having an interior surface and an exterior surface, and a second portion having an interior surface and an exterior surface and at least one raised feature extending from the interior surface with at least one edge. The first portion and the second portion define a hollow space. The air inlet also includes at least one support member including a first end and a second end that extends from the interior surface of the first portion toward the interior surface of the second portion. The second end of the support member is positioned against the edge of the raised feature, wherein when an external force is applied to the air inlet, the second end of the support member is deflected away from the edge of the raised feature.

In yet another embodiment, a motor vehicle includes an engine component, a hood, and an air inlet disposed between the engine component and the hood. The air inlet includes a first portion having an interior surface and an exterior surface, and a second portion having an interior surface and an exterior surface and including at least one deformation zone. The first portion and the second portion define a hollow space. The air inlet also includes at least one support member including a first end and a second end that extends from the interior surface of the first portion toward the interior surface of the second portion. The second end of the support member contacts the deformation zone, wherein when an external force is applied to the air inlet, the second end of the support member extends through the deformation zone.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed toward elastically deformable air inlets for motor vehicles. Referring generally to the figures, the air inlet generally includes first and second portions, a coupling region, a duct, and a bracket. The first and second portions each include an interior surface and an exterior surface, where the interior surface of the first portion is oriented to face the interior surface of the second portion and define a hollow space therebetween. In an example embodiment, the first portion further includes a support member and the second portion further includes a deformation zone. The support member extends from the interior surface of the first portion and rests against the deformation zone of the second portion. In the event of an external force to the hood of the motor vehicle and its subsequent deformation, the first portion of the air inlet may collapse, forcing the support member through the deformation zone of the second portion and allowing the air inlet to elastically deform without breaking or failing. Various examples of elastically deformable air inlets are described in detail below.

Figure 1:
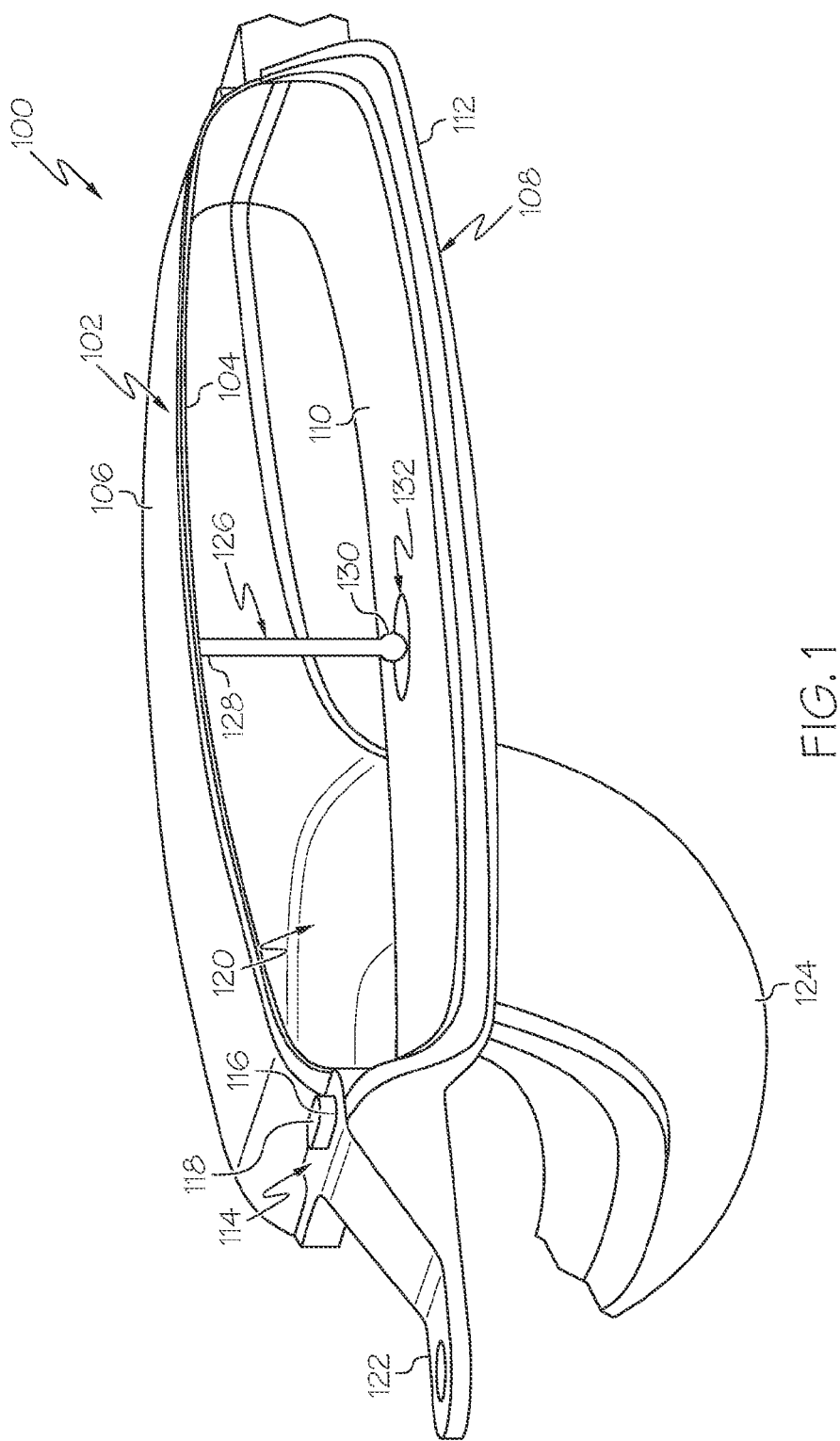
FIG. 1 depicts a perspective view of an air inlet with a support member and a deformation zone according to one or more embodiments shown and described herein.

Referring now to FIG. 1, an air inlet 100 according to one embodiment is schematically depicted. The air inlet 100 generally includes a first portion 102, a second portion 108, a coupling region 114, a bracket 122, and a duct 124. The first portion 102 includes an interior surface 104 and an exterior surface 106. Similarly, the second portion 108 includes an interior surface 110 and an exterior surface 112. The first portion 102 and second portion 108 are oriented so that the interior surface 104 of the first portion 102 and the interior surface 110 of the second portion 108 face each other and define a hollow space 120 therebetween. In some embodiments, the first portion 102 and second portion 108 are connected at a coupling region 114. The coupling region 114 may include a tab 116 and an opening 118 to allow the first portion 102 and second portion 108 to be connected. The first portion 102 and second portion 108 may also be coupled by any other suitable method such as by clamping or the use of fasteners. Alternatively, the first portion 102 and second portion 108 may also be formed integrally by any suitable method such as injection molding. The air inlet 100 may further include a bracket 122 for securing the air inlet 100 to a surface under the hood of a motor vehicle and a duct 124 to connect the air inlet 100 with an underhood component, such as an engine, for example, allowing the air inlet 100 to supply air to the underhood component.

Figure 2:
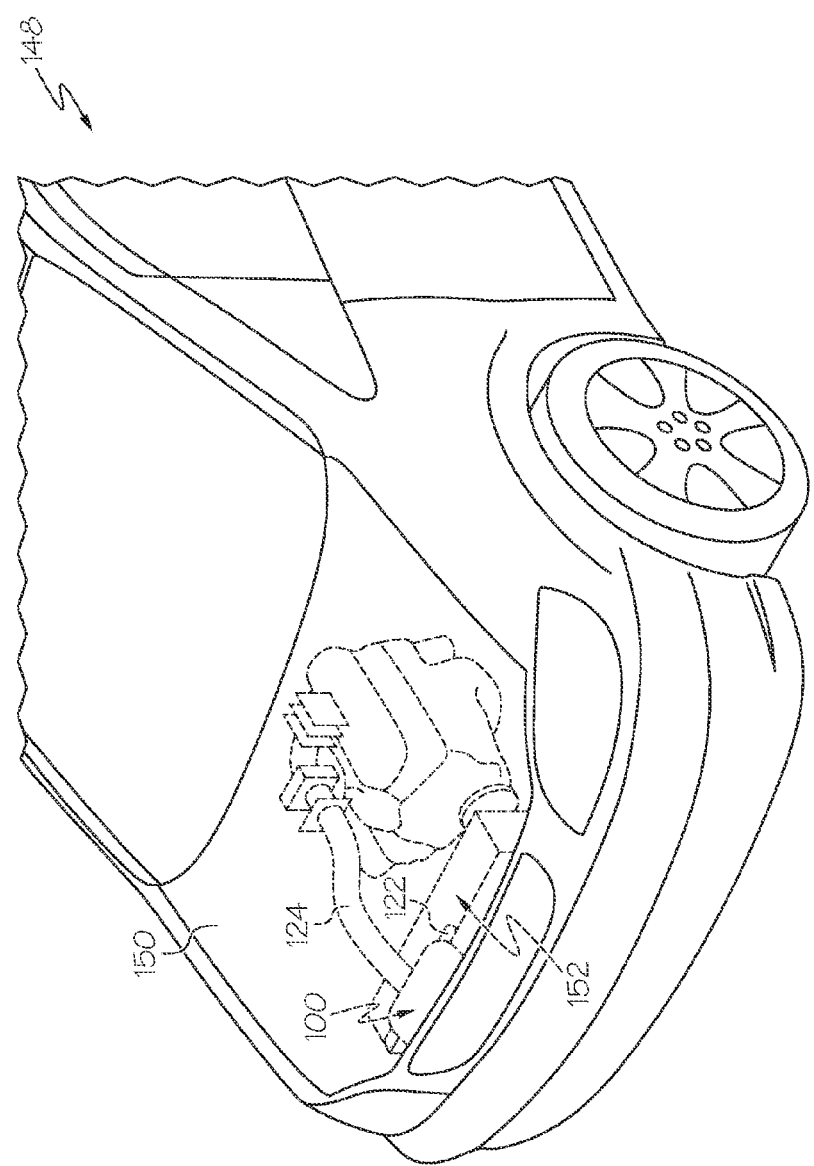
FIG. 2 depicts a perspective view of the front portion of a motor vehicle with a hood, an underhood component, and an air inlet according to one or more embodiments shown and described herein.

Referring now to FIG. 2, the placement of the air inlet 100 according to one embodiment within the front part of a motor vehicle 148 is schematically depicted. The motor vehicle 148 includes a hood 150, an underhood support 152, and an air inlet 100. The air inlet 100 is disposed between the hood 150 and an underhood support 152 and is secured to the underhood support 152 by the use of the bracket 122. The bracket 122 may be secured to the underhood support 152 by any suitable means including bolting. The duct 124 runs from the air inlet 100 to an underhood component, such as an engine. As described in more detail below, an external force may deform the hood, causing the air inlet to also deform between the hood 150 and an underhood component, such as the underhood support 152.

Figure 3:
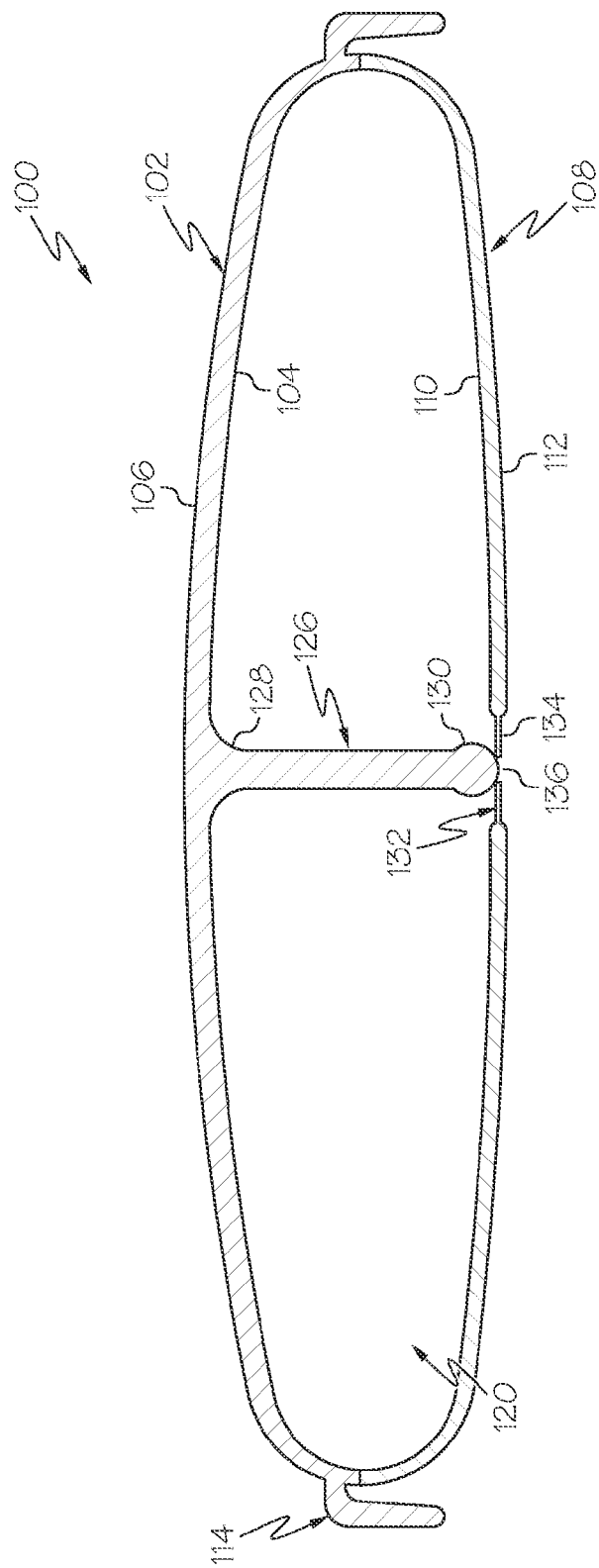
FIG. 3 depicts a cross sectional view of an air inlet with a support member and a deformation zone according to one or more embodiments shown and described herein.

Referring now to FIGS. 1 and 3, in the illustrated embodiment, the air inlet 100 includes at least one support member 126 that includes a first end 128 and a second end 130. The illustrated air inlet 100 also includes a deformation zone 132. In some embodiments, the first end 128 of the support member 126 is attached to the interior surface 104 of the first portion 102 by any suitable method or material including adhesive, mechanical coupling, and the like. Alternatively, the first end 128 of the support member 126 may also be formed integrally with the interior surface 104 of the first portion 102 by any suitable method such as injection molding. The support member 126 may be circular, triangular, or any other suitable shape. The second end 130 of the support member 126 is positioned against the deformation zone 132. The deformation zone 132 is formed integrally with the second portion 108.

Components of the air inlet 100 may be made from a variety of materials having appropriate material properties, including strength, modulus, impact resistance, and fracture toughness, for the application. The first portion 102, second portion 108, support member 126, and deformation zone 132 may be made of any suitable material such as polypropylene and may be formed using any suitable method or process such as injection molding.

Figure 4:
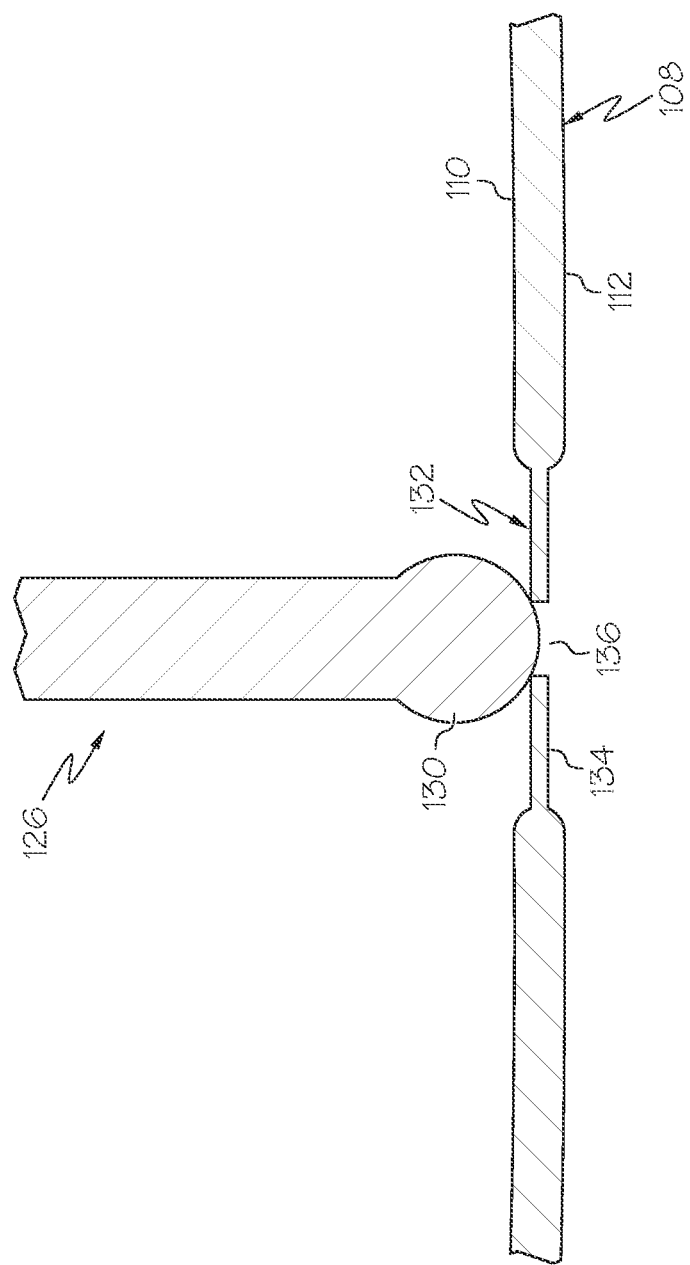
FIG. 4 depicts a cross sectional view of a support member and a deformation zone according to one or more embodiments shown and described herein.

Referring now to FIGS. 3 and 4, the deformation zone 132 may be circular, triangular, rectangular, square, or any other suitable shape. In some embodiments, the deformation zone 132 includes an outside area 134 and a hollow inside area 136 that defines an opening. The outside area 134 has a thickness that is thinner than the thickness of the second portion 108. For example, in some embodiments, the outside area 134 has a thickness of about 10% to 50% of the thickness of the second portion 108. As a non-limiting example, the outside area 134 of the deformation zone 132 may have a thickness of about 1 mm. The second end 130 of the support member 126 is positioned against the outside area 134 of the deformation zone 132. The inside area 136 of the deformation zone 132 has a diameter that is smaller than the diameter of the second end 130 of the support member 126. The deformation zone 132 supports the support member 126, allowing the air inlet 100 to keep its shape under the normal weight of a closed hood of a motor vehicle. In some embodiments, the air inlet includes one support member and one deformation zone. In other embodiments, the air inlet includes more than one support member and an equal number of deformation zones. In yet another embodiment, the air inlet includes more than one support member and an unequal number of deformation zones, wherein two or more support members may rest against one deformation zone.

Figure 5:
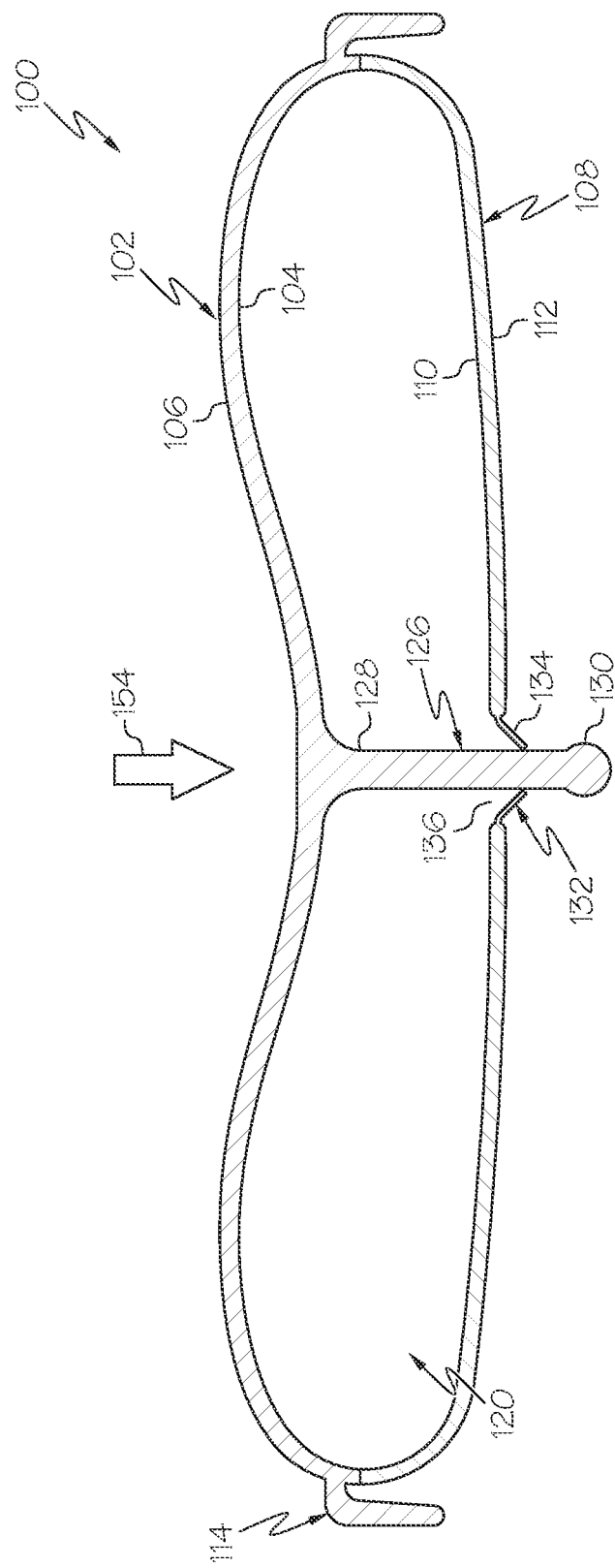
FIG. 5 depicts a cross sectional view of an air inlet with a support member and a deformation zone subject to an external force according to one or more embodiments shown and described herein.

Referring now to FIG. 5, an external force 154 is exerted on the motor vehicle (e.g., by an impact). If the external force 154 is exerted on the hood of the motor vehicle, the hood will deform and transfer part of the external force 154 to the air inlet 100. For example, the external force 154 may be first applied to the first portion 102 of the air inlet 100. In that instance, the first portion 102 moves away from the application of the external force 154 and causes the support member 126 to move in the same direction. The second end 130 of the support member 126 then moves through the deformation zone 132. In some embodiments, the outside area 134 of the deformation zone 132 is deflected by the second end 130 of the support member 126 and moves away to allow the support member 126 to move through the inside area 136 of the deformation zone 132 without tearing, breaking, or otherwise failing. As a result, the first portion 102 and the support member 126 continue to move under the external force 154 and allow the air inlet 100 to bend or deform without breaking or otherwise failing. After the external force 154 is removed from the air inlet 100, the air inlet 100 may be repositioned and reused. For example, the support member 126 can be pulled back through the inside area 136 of the deformation zone 132 and repositioned against the outside area 134 of the deformation zone 132.

Figure 6:
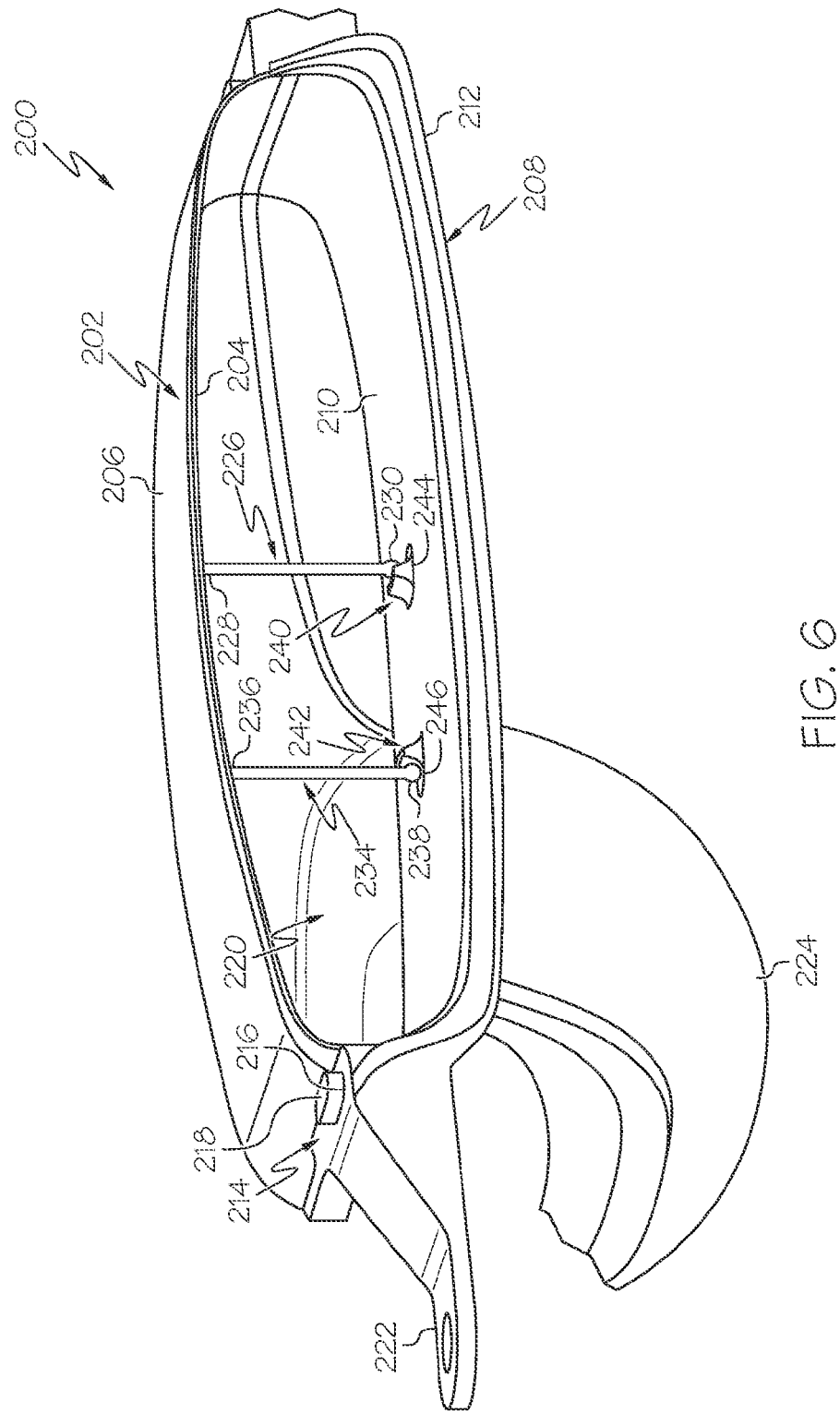
FIG. 6 depicts a perspective view of an air inlet with two support members and two raised features according to one or more embodiments shown and described herein.

Referring now to FIG. 6, an exemplary air inlet 200 according to one embodiment is schematically depicted. The example air inlet 200 generally includes a first portion 202, a second portion 208, a coupling region 214, a bracket 222, and a duct 224. The first portion 202 includes an interior surface 204 and an exterior surface 206. Similarly, the second portion 208 includes an interior surface 210 and an exterior surface 212. The first portion 202 and second portion 208 are oriented so that the interior surface 204 of the first portion 202 and the interior surface 210 of the second portion 208 face each other and define a hollow space 220 therebetween. In some embodiments, the first portion 202 and second portion 208 are connected at a coupling region 214. The coupling region 214 may include a tab 216 and an opening 218 to allow the first portion 202 and second portion 208 to be connected. The first portion 202 and second portion 208 may also be coupled by any other suitable method such as by clamping or by the use of fasteners. Alternatively, the first portion 202 and second portion 208 may also be formed integrally by any suitable method such as injection molding. The air inlet 200 may further include a bracket 222 for securing the air inlet 200 to a surface under the hood of a motor vehicle and a duct 224 to connect the air inlet 200 with an underhood component, such as an engine, for example, allowing the air inlet 200 to supply air to the underhood component.

Figure 7:
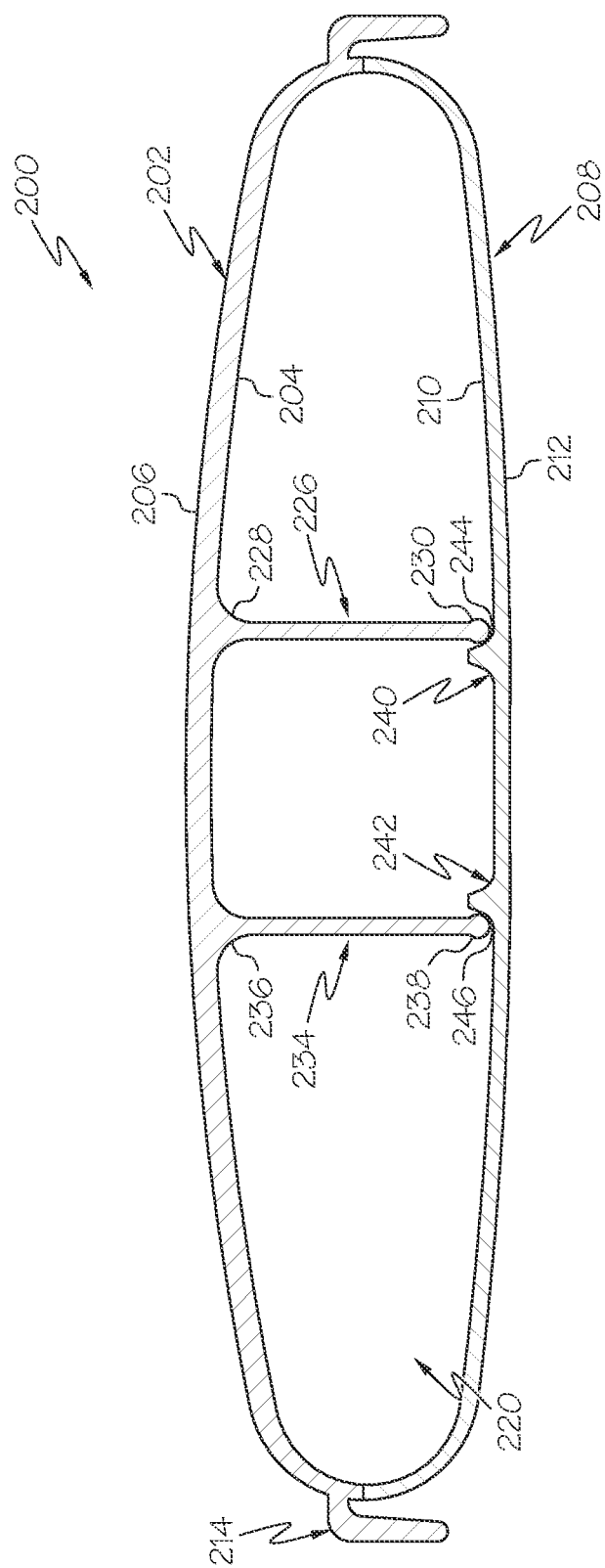
FIG. 7 depicts a cross sectional view of an air inlet with two support members and two raised features according to one or more embodiments shown and described herein.

Referring now to FIGS. 6 and 7, the air inlet 200 also includes two support members 226, 234 that include a first end 228, 236 and a second end 230, 238. The air inlet 200 may also include two raised features 240, 242, each of which include at least one edge 244, 246. In some embodiments, the first ends 228, 236 of the support members 226, 234 are attached to the interior surface 204 of the first portion 202 by any suitable method or material including adhesive, mechanical coupling, and the like. Alternatively, the first ends 228, 236 of the support members 226, 234 may also be formed integrally with the interior surface 204 of the first portion 202. The support members 226, 234 may be circular, triangular, or any other suitable shape.

Components of the air inlet 200 may be made from a variety of materials having appropriate material properties, including strength, modulus, impact resistance, and fracture toughness, for the application. The first portion 202, second portion 208, support members 226, 234, and raised features 240, 242 may be made of any suitable material such as polypropylene and may be formed using any suitable method or process such as injection molding.

Figure 8:
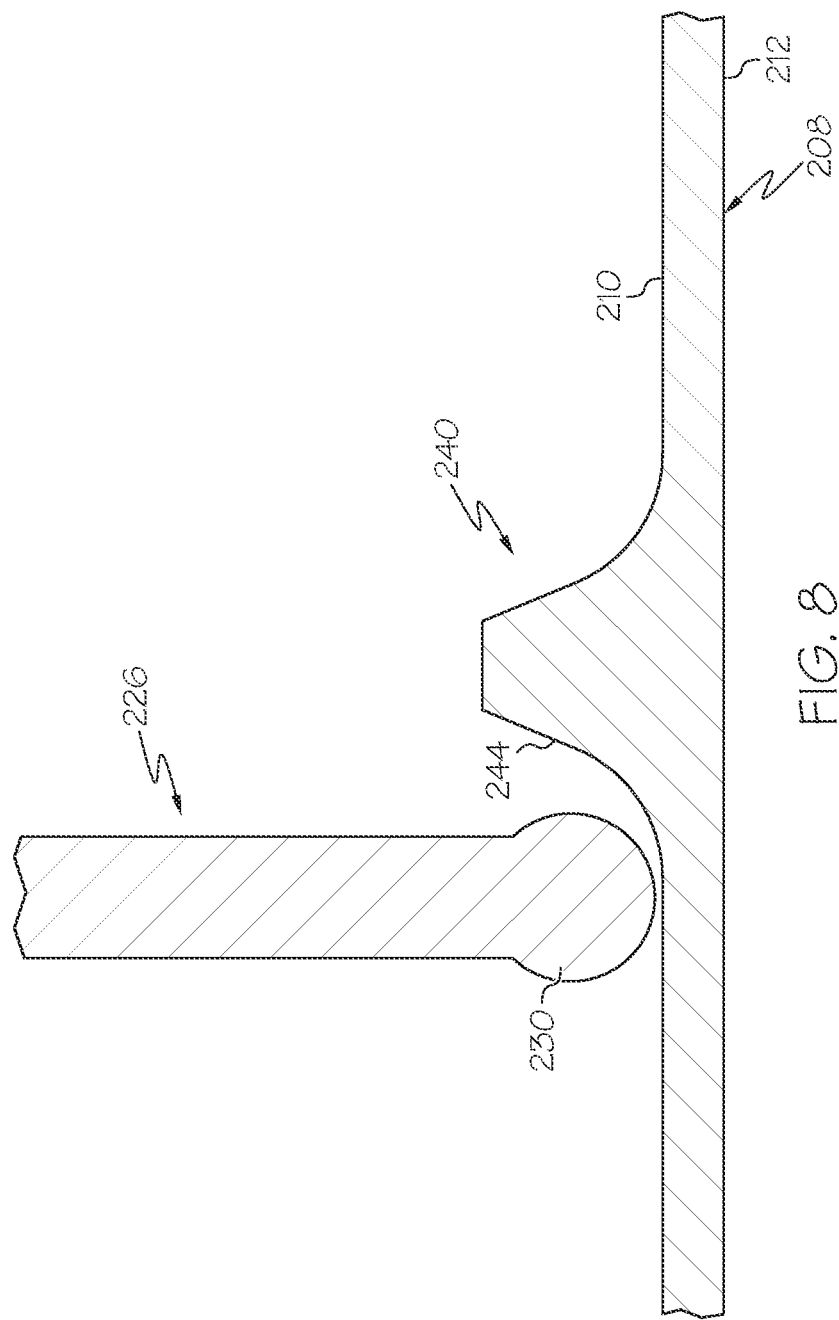
FIG. 8 depicts a cross sectional view of a support member and a raised feature according to one or more embodiments shown and described herein.

Referring now to FIGS. 7 and 8, the second ends 230, 238 of the support members 226, 234 are positioned against the edges 244, 246 of the raised features 240, 242. The raised features 240, 242 are formed integrally with the second portion 208. The raised features 240, 242 may be trapezoidal, quadrilateral, rhomboidal, or any other suitable shape. The raised features 240, 242 have a height that is shorter than the distance between the interior surface 204 of the first portion 202 and the interior surface 210 of the second portion 208. For example, in some embodiments, the height of the raised features 240, 242 is less than 10% of the distance between the interior surface 204 of the first portion 202 and the interior surface 210 of the second portion 208. As another non-limiting example, the height of the raised features 240, 242 may be about 3 mm. The edges 244, 246 of the raised features 240, 242 have a length that is equal to or greater than the diameter of the second ends 230, 238 of the support members 226, 234. In some embodiments, the edges 244, 246 of the raised features 240, 242 are sloped. The second ends 230, 238 of the support members 226, 234 are positioned on the interior surface 210 of the second portion 208 and against the edges 244, 246 of the raised features 240, 242, allowing the air inlet 200 to keep its shape under the normal weight of a closed hood of a motor vehicle. In some embodiments, the air inlet includes one support member and one raised feature. In other embodiments, the air inlet includes more than one support member and an equal number of raised features. In yet another embodiment, the air inlet includes more than one support member and an unequal number of raised features, wherein two support members are positioned against an edge on opposite sides of the same raised feature.

Figure 9:
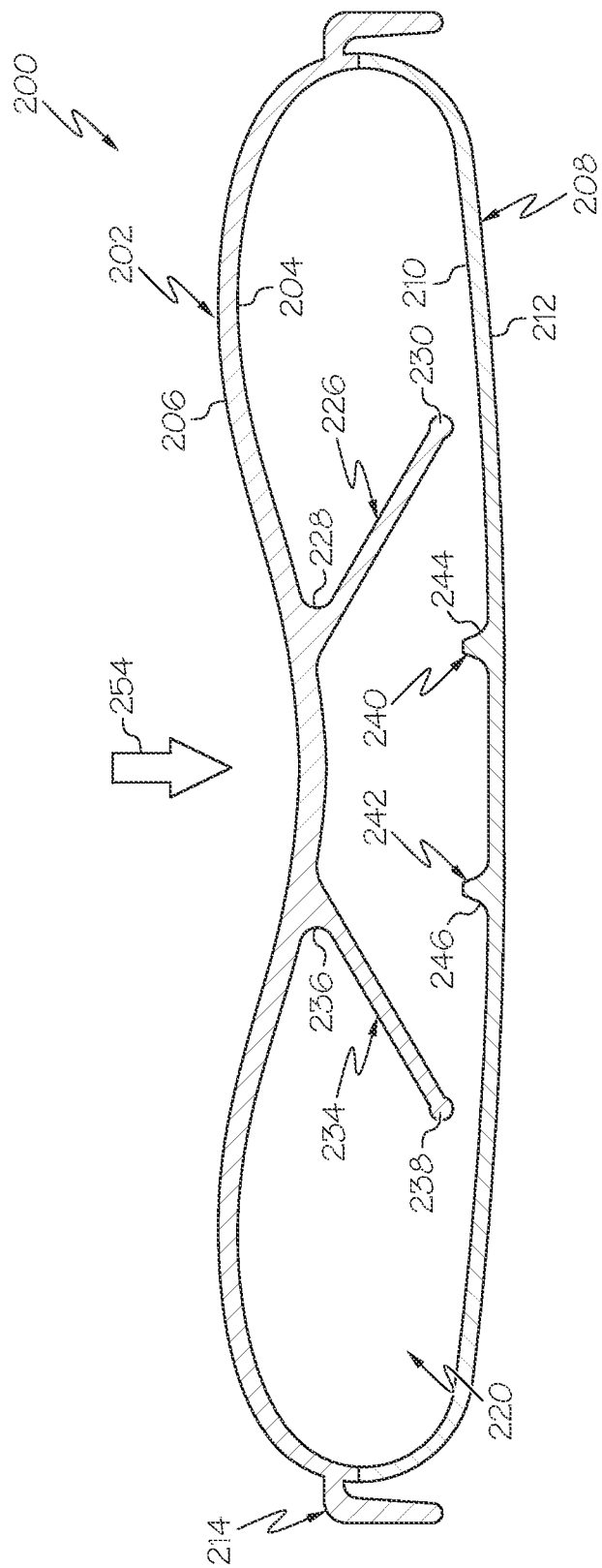
FIG. 9 depicts a cross sectional view of an air inlet with two support members and two raised features subject to an external force according to one or more embodiments shown and described herein.

Referring now to FIG. 9, an external force 254 is exerted on the motor vehicle (e.g., by an impact). If the external force 254 is exerted on the hood of the motor vehicle, the hood will deform and transfer part of the external force 254 to the air inlet 200. For example, the external force 254 may be first applied to the first portion 202 of the air inlet 200. In that instance, the first portion 202 moves away from the external force 254 and causes the support members 226, 234 to also move in the same direction. As a result, the second ends 230, 238 of the support members 226, 234 will start to slide along the interior surface 210 of the second portion 208 due to the applied external force. The edges 244, 246 of the raised features 240, 242 guide the support members 226, 234 in a direction away from the raised features 240, 242, allowing the first portion 202 to continue moving opposite the external force 254 and the air inlet 200 to deform without breaking or otherwise failing.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An air inlet comprising:
    a first portion having an interior surface and an exterior surface;
    a second portion having an interior surface and an exterior surface, the second portion comprising at least one deformation zone, wherein the first portion and the second portion define a hollow space; and
    at least one support member comprising a first end and a second end, the at least one support member extending from the interior surface of the first portion and toward the interior surface of the second portion such that the second end of the at least one support member contacts the at least one deformation zone, wherein when an external force is applied to the air inlet, the second end of the at least one support member extends through the at least one deformation zone.

2. The air inlet of claim 1, wherein the at least one support member comprises two support members and the at least one deformation zone comprises two deformation zones.

3. The air inlet of claim 1, wherein the first portion and the second portion are formed from polypropylene.

4. The air inlet of claim 1, wherein the at least one deformation zone has a circular shape.

5. The air inlet of claim 4, wherein the at least one deformation zone comprises an outside area and an inside area, wherein the inside area comprises a hollow opening.

6. The air inlet of claim 5, wherein the second end of the at least one support member has a first diameter and the inside area of the at least one deformation zone has a second diameter that is less than the first diameter of the second end of the at least one support member.

7. The air inlet of claim 1, wherein the second portion has a first thickness and the at least one deformation zone has a second thickness that is between about 10% to about 50% of the first thickness of the second portion.

8. An air inlet comprising:
    a first portion having an interior surface and an exterior surface;
    a second portion having an interior surface and an exterior surface, the second portion comprising at least one raised feature extending from the interior surface and comprising an edge, wherein the first portion and the second portion define a hollow space; and at least one support member comprising a first end and a second end, the at least one support member extending from the interior surface of the first portion and toward the interior surface of the second portion such that the second end of the at least one support member is positioned against the edge of the at least one raised feature, wherein when an external force is applied to the air inlet, the second end of the at least one support member is deflected away from the edge of the at least one raised feature.

9. The air inlet of claim 8, wherein the at least one support member comprises two support members and the at least one raised feature comprises two raised features.

10. The air inlet of claim 8, wherein the first portion and second portion are formed from polypropylene.

11. The air inlet of claim 8, wherein the first portion and second portion are separated by a distance and the at least one raised feature has a height, the height being less than 10% of the distance between the first portion and the second portion.

12. The air inlet of claim 8, wherein the edge of the at least one raised feature has a length and the second end of the at least one support member has a diameter such that the length of the edge of the at least one raised feature is equal to or greater than the diameter of the second end of the at least one support member.

13. The air inlet of claim 8, wherein the at least one raised feature has a triangular, quadrilateral, trapezoidal, or rhomboidal shape.

14. A vehicle comprising:
an engine component;
a hood; and
an air inlet disposed between the engine component and the hood, the air inlet comprising:
    a first portion having an interior surface and an exterior surface;
    a second portion having an interior surface and an exterior surface, the second portion comprising at least one deformation zone, wherein the first portion and the second portion define a hollow space; and
    at least one support member comprising a first end and a second end, the at least one support member extending from the interior surface of the first portion and toward the interior surface of the second portion such that the second end of the at least one support member contacts the at least one deformation zone of the second portion, wherein when an external force is applied to the air inlet, the second end of the at least one support member extends through the at least one deformation zone.

15. The air inlet of claim 14, wherein the at least one support member comprises two support members and the at least one deformation zone comprises two deformation zones.

16. The air inlet of claim 14, wherein the first portion and the second portion are formed from polypropylene.

17. The air inlet of claim 14, wherein the at least one deformation zone has a circular shape.

18. The air inlet of claim 17, wherein the at least one deformation zone comprises an outside area and an inside area wherein the inside area comprises a hollow opening.

19. The air inlet of claim 18, wherein the second end of the at least one support member has a first diameter and the inside area of the at least one deformation zone has a second diameter that is less than the first diameter of the second end of the at least one support member.

20. The air inlet of claim 14, wherein the second portion has a first thickness and the at least one deformation zone has a second thickness that is between about 10% to about 50% of the first thickness of the second portion.

* * * * *

UNITED STATES PATENT AND TRADEMARK OFFICE
CERTIFICATE OF CORRECTION

PATENT NO. : 9,027,683 B2
APPLICATION NO. : 14/039327
DATED : May 12, 2015
INVENTOR(S) : Chad A. Barnes Page 1 of 1

It is certified that error appears in the above-identified patent and that said Letters Patent is hereby corrected as shown below:

Title Page

Item (73) Assignee: should read as follows

Toyota Motor Engineering & Manufacturing North America, Inc.

Signed and Sealed this
Twenty-eighth Day of June, 2016

Michelle K. Lee
*Director of the United States Patent and Trademark Office*